United States Patent Office 2,772,166
Patented Nov. 27, 1956

2,772,166

HYDROPHILIC COMPOSITIONS AND THEIR PREPARATION

William F. Fowler, Jr., Rochester, N. Y., assignor to Eastman Kodak Company, Rochester, N. Y., a corporation of New Jersey No Drawing. Application February 11, 1953,
Serial No. 336,431

10 Claims. (Cl. 96—114)

My invention relates to hydrophilic compositions comprising a naturally-occurring hydrophilic colloid and a hydrosol which imparts flexibility and other advantageous properties to the hydrophilic colloid. My invention also relates to the preparation of the hydrosols as are employed in my compositions.

Hydrophilic colloids are useful in many connections particularly those of a photographic nature due to the optical clarity of attenuated products which may be prepared therefrom. Gelatin, for example, is typical of the naturally-occurring hydrophilic colloids particularly those of the protein type. In general, photographic emulsions at the present time employ gelatin as the hydrophilic colloidal material therein.

One of the principal objections to gelatin and other like colloids is their brittleness when coated out from aqueous solution in the form of a layer of substantial thickness. Various attempts have been made to improve the flexibility of gelatin and like colloids by adding thereto, prior to coating, suspensions of elastic material. These attempts to improve the flexibility of gelatin have usually been unsatisfactory because of the optical and mechanical incompatibility of the gelatin with the additive resulting in haziness of the final film or coagulation of the suspension before the gelatin layer has dried. For instance, addition of water-soluble polymers to gelatin or the like has been generally unsatisfactory as usually these polymers are either incompatible with the gelatin at some point or exhibit brittleness.

One object of my invention is to provide gelatin compositions which are adapted to provide layers thereof improved in flexibility or other properties over the layers which are obtained when only gelatin is used. Another object of my invention is to provide gelatin compositions which when coated out and dried experience no loss of optical properties. A further object of my invention is to provide gelatin compositions with improved flexibility but having substantially the same refractive index as gelatin itself. A still further object of my invention is to prepare hydrosols which are readily compatible with aqueous gelatin solutions. A still further object of my invention is to improve gelatin by mixing therewith an aqueous dispersion of a polymer having an anionic component resulting from the dispersion polymerization of a mixture of an ester of acrylic or substituted acrylic acid, acrylic acid and styrene or acrylonitrile. Other objects of my invention will appear herein.

I have found that hydrosols which are compatible with gelatin and which improve the flexibility properties thereof are prepared by an emulsion polymerization of styrene or acrylonitrile with an alkyl ester of an acrylic acid and acrylic acid in proportions such as will be specified herein. Hydrosols as thus prepared particularly when having a pH of at least 3 can be mixed with hydrophilic colloids such as gelatin in aqueous solution in all proportions particularly in the range of 10 to 90% and no coagulation will occur in any step of the use of the resulting composition for coatings and the coating so obtained will have excellent flexibility and optical clarity. In adition the tensile strength of the gelatin or other colloid is maintained even when a fairly high percentage of the hydrosol is used therewith.

The hydrosols or latices employed in preparing improved gelatin compositions as described herein are prepared by an emulsion polymerization of a mixture of styrene or acrylonitrile with an alkyl ester of an acrylic acid and acrylic acid. The alkyl ester which is employed is one in which the alkyl is of at least two carbon atoms. The methyl esters, when employed in the preparation of hydrosols, do not impart the desired increase in flexibility to gelatin. Some of the acrylic acid esters which may be employed in preparing these hydrosols are ethyl acrylate, n-propyl acrylate, isopropyl acrylate, isobutyl acrylate, n-amyl acrylate, isoamyl acrylate, n-hexyl acrylate, 2-ethyl hexyl acrylate, n-octyl acrylate, n-decyl acrylate, n-butyl methacrylate, isobutyl methacrylate, n-amyl methacrylate, 2-ethyl hexyl methacrylate, n-octyl methacrylate, n-decyl methacrylate, β-cyanoethyl acrylate, β-cyanoethyl methacrylate, β-chloroethyl acrylate, β-chloroethyl methacrylate, n-butyl acrylate. The compositions which are employed should contain at least 1½–5 parts of alkyl ester per part of styrene or acrylonitrile. With less quantities of acrylic acid ester non-uniformity is experienced as regards compatibility with gelatin and also better flexibility is obtained with the use of the alkyl ester in larger proportion than the styrene or acrylonitrile. The acrylic acid content should be 1–20% based on the total monomer which is employed. Without the use of any acrylic acid there is danger of coagulation upon mixing the resulting hydrosol with gelatin whereas when more acrylic acid is employed than indicated the product exhibits large particle size and thus a poor dispersion may result.

As the hardening component of the hydrosol any of the following compounds may be employed: o-methyl styrene, m-methyl styrene, p-methyl styrene, 2,4-dimethyl styrene, 2,5-dimethyl styrene, 3,4-dimethyl styrene, 3,5-dimethyl styrene, 2,4,5-trimethyl styrene, 2,4,6-trimethyl styrene, 2,4,5-triethyl styrene, o-ethyl styrene, m-ethyl styrene, p-ethyl styrene, 3,5-diethyl styrene, p-n-butyl styrene, m-sec-butyl styrene, m-tert-butyl styrene, p-hexyl styrene, p-n-heptyl styrene, p-2-ethyl hexyl styrene, o-fluoro styrene, m-fluoro styrene, p-fluorostyrene, o-chloro styrene, m-chloro styrene, p-chloro styrene, 2,3-dichloro styrene, 2,4-dichloro styrene, 2,5-dichloro styrene, 2,6-dichloro styrene, 3,4-dichloro styrene, 3,5-dichloro styrene, 2,3,4,5,6-pentachloro styrene, m-trifluoromethyl styrene, o-cyano styrene, m-cyano styrene, m-nitro styrene, p-nitro styrene, p-dimethylamino styrene, styrene, α-chloroacrylonitrile, α-bromoacrylonitrile, α-trifluoromethylacrylonitrile, vinylidene cyanide, α-trifluoromethyl carboxy acrylonitrile, methyl methacrylate and ethyl methacrylate. Instead of or with acrylic acid any of the following acids may be employed: α-methyl acrylic acid, α-fluoro acrylic acid, α-chloro acrylic acid, and α-bromo acrylic acid.

The preparation of the hydrosol is carried out in an aqueous system containing a wetting agent so as to facilitate the dispersion of the monomers in the water. Also a per-compound or some other catalyst is desirable to promote the polymerization of the monomer constituent of the system. I have found that it is desirable to carry out the polymerization at an elevated temperature such as 80° C. as at this temperature usually an hour is sufficient to obtain the desired amount of polymerization. Temperatures above 80° can be employed but much above this point would build up pressure which is not particularly desirable unless some provision is made therefor such as the use of reflux or carrying out the reaction under enclosed conditions. It is to be understood however that temperatures below 80° C. can be employed, for instance a temperature on the order of 50° C. may be used but several hours would be needed to obtain the desired hydrosols. With temperatures below this point ordinarily the catalyst employed should be of a stronger type than specified (such as redox type) or some other condition should be used to promote the reaction.

After the hydrosol has been formed it may be mixed directly with an aqueous solution of a hydrophilic colloid although if the pH thereof is below 3 it is desirable that some water-soluble base be added to increase the pH to 3 or above to assure good compatibility with gelatin on the other material involved. The hydrosols prepared by emulsion polymerization as described can be mixed with hydrophilic colloids in various proportions such as from 10 to 90% and coatings having flexibility and optical clarity will result. For gelatin compositions which are to be employed in photography it is desirable that the pH be adjusted to 4.5–7, upon mixing with the gelatin. Other naturally occurring hydrophilic colloids than gelatin may be mixed with the hydrosols prepared as described and naturally occurring hydrophilic colloids such as proteins, casein, gluten and zein. Casein is particularly useful if that protein is first modified by treating its solution in dilute alcohol with acrylic acid and hydrogen peroxide at an elevated temperature.

The compositions prepared in accordance with my invention may be employed by coating out in any conventional procedure upon the surface to be coated. The coatings thus prepared exhibited good flexibility properties thus making these coatings useful not only for protective coatings but also for the purpose of carrying silver halide in photographic emulsions.

The following examples illustrate the preparation of hydrosols in accordance with my invention:

*Example 1*

A reaction vessel was equipped with a dropping funnel, a mechanical stirrer and a liquid thermometer. In this vessel 2.5 parts of sodium lauryl sulfate and one part of sodium persulfate was dissolved in 800 parts of hot water. The temperature of the water in the vessel was raised to 80° C. at which time a mixture of 150 parts of n-butyl acrylate, 64 parts of acrylonitrile and 40 parts of acrylic acid were added slowly with stirring while at the same time adding 2½ grams more of sodium lauryl sulfate in solution in 200 parts of hot water. The temperature of the mass was held at 80–82° C. by the application of external heat and at the end of 45 minutes any monomer remaining and further wetting agent were added to the mass. At the end of this time the mass was heated and stirred whereupon the container was then water cooled. The product obtained was filtered through a fine mesh cloth. A hydrosol was obtained which was nearly opaque and had a pH of 2.75. This suspension of polymer was diluted down to 10% solids and mixed with a 10% solution of gelatin at about 50° C. Coagulation will occur unless the hydrosol is first adjusted to a pH of greater than 3 with ammonium hydroxide and then added to the gelatin. There was good compatibility, a marked increase in the translucency of the hydrosol and upon coating out on a glass plate and drying a clear, brilliant coating was obtained.

*Example 2*

The procedure employed in the preceding example was followed except that a monomer mixture of 164 parts of n-butyl acrylate, 70 parts of acrylonitrile and 20 parts of acrylic acid were mixed together. It was found that the hydrosol which was obtained after adjusting the pH thereof to greater than 3 with ammonium hydroxide solution readily combined with an aqueous solution of gelatin and formed a layer having good flexibility and optical clarity.

*Example 3*

The procedure outlined in the preceding examples was followed except that 171 parts of acrylate ester was employed with 73 parts of acrylonitrile and 10 parts of acrylic acid. A hydrosol was obtained having a pH of 3.28. A small amount of ammonium hydroxide was added to raise the pH to approximately 6. The resulting hydrosol was found to be readily compatible with gelatin and to give layers thereof having good flexibility.

*Example 4*

A hydrosol was prepared using as the monomer mixture 171 parts of ethylacrylate, 73 parts of acrylonitrile and 10 parts of acrylic acid. A hydrosol having a pH of 3.5 was obtained. Ammonium hydroxide was added to increase the pH and the hydrosol was then mixed with aqueous gelatin. It was noted here that the viscosity of the gelatin was increased by the mixing operation and also that gelation of this mixture was very rapid upon cooling the same.

*Example 5*

A hydrosol was prepared as described in the preceding examples except that the monomer mixture consisted of 164 parts of isobutyl acrylate, 70 parts of styrene and 20 parts of acrylic acid. A hydrosol was obtained having a pH of 2.68. This pH was increased with ammonium hydroxide solution and it was then mixed with gelatin in the same manner as described. Good compatibility was noted and layers prepared therefrom exhibited good flexibility.

*Example 6*

The procedure as described was followed except that the monomer mixture was made up of 171 parts of n-butyl acrylate, 73 parts of styrene and 10 parts of acrylic acid. A hydrosol having a pH of 3 was obtained. Ammonium hydroxide was added to raise the value of pH to 4.5–7. The hydrosol was then mixed with gelatin solution. Good compatibility was found and improvement in the flexibility of gelatin resulted.

*Example 7*

A hydrosol was prepared as described except that the monomer mixture was made of 175 parts of ethyl acrylate, 73 parts of styrene and 10 parts of acrylic acid. A hydrosol having a pH of 3.10 was obtained. The pH thereof was adjusted with ammonium hydroxide solution and the resulting product was found to have good compatibility with gelatin and gave layers having good flexibility and optical clarity.

Various hydrosols prepared as described herein were mixed with gelatin and the flexibilities were measured. For instance, the hydrosol prepared as described in Example 3 above was mixed with gelatin in various proportions. Coatings .003 inch thick were prepared, dried at raised temperature and conditioned at 15% relative humidity at 70° F. until equilibrium was established. Upon tesing for flexibility the following values were obtained:

| Percent Gelatin | Percent Geltex Hydrosol (solid content) | Folds |
| --- | --- | --- |
| 100 | 0 | 5 |
| 90 | 10 | 12 |
| 85 | 15 | 17 |
| 75 | 25 | 37 |
| 70 | 30 | 45 |
| 65 | 35 | 42 |
| 60 | 40 | 47 |
| 55 | 45 | 53 |
| 50 | 50 | 750+ |

A composition was also prepared of gelatin and the hydrosol as prepared in Example 2, each being employed in equal parts based on solid content. The flexibility obtained in the case of a coating of .003 inch thick was 750+ folds. With the hydrosol of Example 4 mixed in equal parts with gelatin the .003 coating exhibited a flexibility of 62 folds.

Compositions prepared in accordance with my invention may be employed particularly in the photographic art in most every application in which gelatin has been employed up to now. For instance, in connection with photographic film, compositions in accordance with my invention may be employed as subbing layers, for antihalation backings (dye added), as the protective colloid for photographic emulsion or as an overcoat to protect the film. In the case of photographic paper, compositions in accordance with my invention may be employed for sizing the paper either by applying to the paper as a tub size or by introducing into the beater in the baryta coating of paper. Compositions in accordance with my invention may either be used as the binder for barium sulfate in the baryta coating of paper or as an overcoat layer to be applied after the application of the barium sulfate or in both. Also compositions in accordance with my invention may be employed as the protective colloid for the silver halide or other sensitizing material in the sensitized emulsions which are used. The compositions of my invention are particularly useful where previously cracking has been detrimental in the use of gelatin itself.

One advantage which resides in the use of the hydrosols in accordance with my invention is that the polymer thereof contains an anionic component and therefore any cationic materials which are employed therewith are bound by the anionic nature of the hydrosol thus employed. This is particularly of value in cases where dyes or other materials of a cationic nature are to be employed in photographic emulsions.

It is to be understood that by the term "proteinaceous hydrophilic colloids," as referred to herein, included therein are modified forms of those materials, as well as the materials themselves. For instance, proteins may be subjected to treatment with an agent which modifies the material to impart additional properties thereto over those which the protein already possesses. For instance, as the hydrophilic colloid in compositions in accordance with my invention, a protein treated with acrylonitrile or methyl acrylate, as described in U. S. Patent No. 2,562,534 of Coffmann, might be employed. Another type of proteinaceous hydrophilic colloid, in preparing compositions in accordance with my invention, is that described in Lowe and Gates application Serial No. 768,480 resulting from the treatment of a protein, such as casein or soy protein, with hydrogen peroxide, or from subjecting a protein of this nature, which has been treated with acrylonitrile, to oxidation by means of hydrogen peroxide. These modified protein materials are compatible with the hydrosols such as have been described herein, and may be mixed therewith in proportions within the range set out for compositions in accordance with my invention.

I claim:

1. A composition useful for the preparation of flexible coatings which comprises an aqueous colloidal dispersion of photographic grade gelatin and the hydrosol which results from the emulsion polymerization of a mixture, the major ingredients of which are (A) 1 part of a monomer selected from the group consisting of styrene, acrylonitrile, alkylated styrenes, halogenated styrenes, cyano styrenes, nitro styrenes, amino styrenes, halogenated acrylonitriles, and vinylidene cyanide, (B) 1½–5 parts of an ester selected from the group consisting of the alkyl acrylates of alkyls of 2–10 carbon atoms and the alkyl methacrylates of alkyls of 4–10 carbon atoms and (C) at least 1% and not more than approximately 8% of acrylic acid, based on the total weight of monomer.

2. A composition useful for the preparation of flexible coatings which comprises an aqueous colloidal dispersion of photographic grade gelatin and the hydrosol which results from the emulsion polymerization of a mixture, the major ingredients of which are 1 part of an acrylonitrile, 1½–5 parts of an alkyl acrylate of alkyls of 2–10 carbon atoms and at least 1% and not more than approximately 8% of acrylic acid, based on the total weight of monomer.

3. A composition useful for the preparation of flexible coatings which comprises an aqueous colloidal dispersion of photographic grade gelatin and the hydrosol resulting from the emulsion polymerization of a mixture, the major ingredients of which are 1 part of a styrene, 1½–5 parts of an alkyl acrylate of alkyls of 2–10 carbon atoms and at least 1% and not more than approximately 8% of acrylic acid, based on the total weight of monomer.

4. A composition useful for the preparation of flexible coatings which comprises an aqueous colloidal dispersion of photographic grade gelatin and the hydrosol resulting from the emulsion polymerization of a mixture, the major ingredients of which are 70 parts of acrylonitrile, 164 parts of butyl acrylate and 20 parts of acrylic acid.

5. A composition useful for the preparation of flexible coatings which comprises an aqueous colloidal dispersion of photographic grade gelatin and the hydrosol resulting from the emulsion polymerization of a mixture, the major ingredients of which are 1 part of acrylonitrile, 1½–5 parts of butyl acrylate and at least 1% and not more than approximately 8% of acrylic acid, based on the total weight of monomer.

6. A composition useful for the preparation of flexible coatings which comprises an aqueous colloidal dispersion of photographic grade gelatin and the hydrosol resulting from the emulsion polymerization of a mixture, the major ingredients of which are 1 part of styrene, 1½–5 parts of butyl acrylate and at least 1% and not more than approximately 8% of acrylic acid, based on the total weight of monomer.

7. A photographic emulsion composition which comprises silver halide carried by a composition comprising an aqueous colloidal dispersion of photographic grade gelatin and the hydrosol resulting from the emulsion polymerization of a mixture, the major ingredients of which are (A) 1 part of a monomer selected from the group consisting of styrene, acrylonitrile, alkylated styrenes, halogenated styrenes, cyano styrenes, nitro styrenes, amino styrenes, halogenated acrylonitriles, and vinylidene cyanide, (B) 1½–5 parts of an ester selected from the group consisting of the alkyl acrylates, the alkyls of which are of 2–10 carbon atoms and the alkyl methacrylates of alkyls of 4–10 carbon atoms and (C) at least 1% and not more than approximately 8% of acrylic acid, based on the total weight of monomer.

8. A photographic emulsion composition which comprises silver halide carried by the composition of an aqueous colloidal dispersion of photographic grade gelatin and the hydrosol resulting from the emulsion polymerization of a mixture, the major ingredients of which are 1 part of acrylonitrile, 1½–5 parts of an alkyl acrylate of alkyls of 2–10 carbon atoms and at least 1% and not more than approximately 8% of acrylic acid, based on the total weight of monomer.

9. A photographic emulsion composition which comprises silver halide carried by the composition of an aqueous colloidal dispersion of photographic grade gelatin and the hydrosol resulting from the emulsion polymerization of a mixture, the major ingredients of which are 1 part of styrene, 1½–5 parts of an alkyl acrylate of alkyls of 2–10 carbon atoms and at least 1% and not more than approximately 8% of acrylic acid, based on the total weight of monomer.

10. A photographic emulsion composition which comprises silver halide carried by a composition of an aqueous colloidal dispersion of photographic grade gelatin and the hydrosol which results from the emulsion polymerization of a mixture, the major ingredients of which are 1 part of acrylonitrile, 1½–5 parts of butyl acrylate and at least 1% and not more than approximately 8% of acrylic acid, based on the total weight of monomer.

References Cited in the file of this patent

UNITED STATES PATENTS

| | | |
|---|---|---|
| 1,981,102 | Hagedorn et al. | Nov. 20, 1934 |
| 2,123,599 | Fikentscher et al. | July 12, 1938 |
| 2,160,054 | Bauer et al. | May 30, 1939 |